May 30, 1967 F. B. DAVIS III 3,323,061

FSK SYSTEM WITH KEYING RATE CONVEYING ANALOG INFORMATION AND THE FREQUENCIES KEYED BETWEEN CONVEYING DIGITAL INFORMATION

Filed Aug. 29, 1963

United States Patent Office 3,323,061

Patented May 30, 1967

3,323,061

FSK SYSTEM WITH KEYING RATE CONVEYING ANALOG INFORMATION AND THE FREQUENCIES KEYED BETWEEN CONVEYING DIGITAL INFORMATION

Frederick B. Davis III, Drexel Hill, Pa., assignor to Leeds & Northrup Company, Philadelphia, Pa., a corporation of Pennsylvania Filed Aug. 29, 1963, Ser. No. 305,259
12 Claims. (Cl. 325—30)

This invention relates to methods and systems for transmission of analog and digital information.

It is an object of the present invention to provide a telemetering signal of such character that carrier energy conveying analog information may also be concurrently used to convey digital information, so to increase the traffic handling capability of communication channels allocated to telemetry and to avoid duplication of expensive and complex equipment.

In accordance with the present invention, the carrier frequency is periodically varied or keyed to swing between predetermined limits at a repetition or keying frequency representative of the analog information, and a change of one or the other of such limits conveys digital information. By way of specific example, when the carrier is conveying only analog information, its frequency is periodically swung back and forth at the keying frequency between a predetermined upper frequency limit and a predetermined lower frequency limit defining the communication channel or the maximum deviation limits of the carrier; when the carrier is additionally conveying binary information, the frequency swings of the carrier at the keying frequency are restricted between one or the other of such limits and a frequency intermediate them.

At the receiver, the telemetering signal is demodulated to provide an A.C. signal or waveform whose frequency corresponds with the analog keying frequency of the carrier. Such A.C. signal is utilized to reproduce the analog information conveyed by the telemetering signal from the transmitter. The demodulated signal is also continuously checked for presence or absence of a periodic D.C. component corresponding with carrier deviations only from an intermediate frequency to one or the other of its aforesaid maximum deviation limits. If one or the other of such components is absent, that characteristic is utilized to reproduce the digital information conveyed in the telemetering signal from the transmitter.

For a more detailed understanding of the method of the present invention and of a preferred system for utilizing it, reference is made to the following discussion and description of the attached drawings in which.

Figures 1A, 1B:
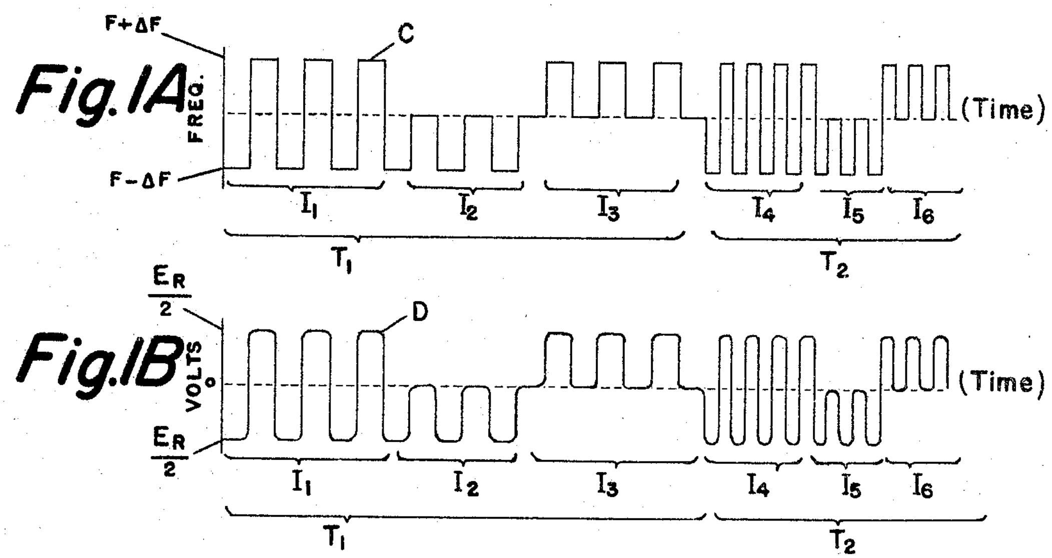
FIG. 1A is exemplary of the waveform of a telemetering carrier modulated to convey analog and digital information.
FIG. 1B is illustrative of the demodulated signal derived from the waveform of FIG 1A.

The nature of the signal produced and utilized for conveying both analog and digital information over a single telemetering channel will become evident from discussion of FIGS. 1A and 1B. Assuming that for a particular interval (as exemplified by interval $I_1$ or $I_4$) only analog information is to be conveyed by the carrier signal C, its frequency is shifted back and forth between a preselected upper deviation limit $F+\Delta F$ and a preselected lower deviation limit $F-\Delta F$ at a repetition frequency corresponding with the then existing magnitude of the variable being monitored. The repetition frequency during interval $I_1$ is constant at a value representing the particular magnitude at which the variable has remained constant during that interval whereas the repetition frequency during interval $I_4$ is constant at a higher value representative of a different magnitude at which the variable has remained constant for interval $I_4$. In short, the repetition frequency is a continuous function, or analog, of the variable. By way of example, the repetition frequency may be varied to any frequency, say in the range of 18 to 30 cycles, to represent the various corresponding magnitudes of temperature, pressure, rate of flow, electrical generation or other variable being monitored. The bandwidth required in the frequency spectrum by the signal C as swinging between the limits $F+\Delta F$ and $F-\Delta F$ will depend upon its selected average frequency F and in general is the narrower the lower the average frequency; for example, with presently available instrumentation, a bandwidth of about only 60 cycles suffices for an average frequency in the range of say 400 to 4,000 cycles; and for frequencies in the higher range of say 9,000 to 13,000 cycles, the bandwidth need be about only 120 cycles. The frequencies $F+\Delta F$ and $F-\Delta F$ are the maximum diviation limits of the carrier C and in any event do not exceed the end frequencies of an assigned telemetering channel.

Additionally to convey low-speed digital information, one or the other of the frequency-deviation limits $F+\Delta F$, $F-\Delta F$ is shifted to a frequency between them, preferably but not necessarily to the average frequency F. When one binary state of a condition exists, that information is incorporated into the modulated signal C by shifting its lower deviation limit from $F+\Delta F$ to F (see time intervals $I_3$, $I_6$ of FIG. 1A). When another binary state of that condition exists, such information is incorporated into the modulated signal C by shifting its upper frequency limit from $F+\Delta F$ to F (see time intervals $I_2$ and $I_5$ of FIG. 1A).

It is to be noted that for the time period $T_1$, which includes the intterva's $I_1$ to $I_3$, the repetition frequency of the signal C remains constant, indicating no change in the analog information concerning the continuous variable, and remains so independently of the presence or absence of the digital information. Similarly, for the time period $T_2$, which includes the periods $I_4$ to $I_6$, the repetition frequency, regardless of the presence or absence of digital information, remains constant at another fixed value, indicating a constant magnitude of the variable which is different from that existing during period $T_1$.

In brief, when the telemetering signal consists only of the upper periodic deviations from frequency F (see intervals $I_3$, $I_6$) it conveys both the analog information represented by the repetition frequency of the deviations and the digital state represented by the positive sense of such deviations with respect to frequency F; when the telemetering signal consists only of the lower periodic deviations from frequency F (see intervals $I_2$ and $I_5$), it conveys both the analog information represented by the repetition frequency of the deviations and the digital state represented by the negative sense of the deviations with respect to frequency F.

The presence of only positive deviations may be used to represent the binary value of 1 (or 0) and the presence of only negative deviations may be used to represent the binary value of 0 (or 1). It is also feasible to use the full deviation-modulation to represent a third state: for example, it may represent 0, with positive deviations only representing +1 (or −1), and with negative deviations only representing −1 (or +1). In all cases, the analog information represented by the repetition frequency of the signal is retained.

In general, a telemetering signal of the character shown in FIG. 1 is produced by periodically varying the frequency of carrier energy between two limiting values at a repetition frequency dependent upon the analog quantity to be transmitted and by changing one or the other of the limits in accordance with the digital information to be transmitted. For decoding of such signal, its repetition frequency is translated by demodulation into a signal D (FIG. 1B) whose frequency is representative of the analog variable and whose sense of deviation from a reference signal representative of the average carrier frequency is translated into a signal representing the digital information.

Various systems for producing and decoding the multiplex telemetering signal above described may, at least for the most part, be synthesized from various available components presently utilized to perform other telemetering methods.

Figure 2:
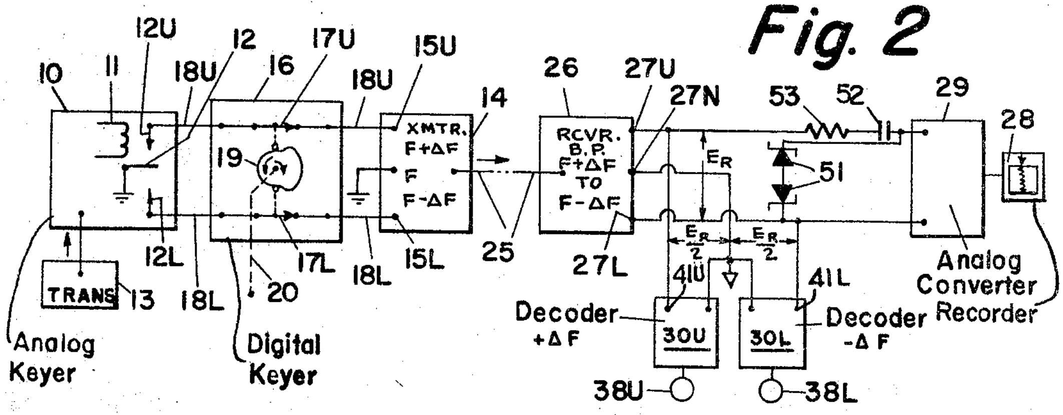
FIG. 2 is a block diagram of a telemetering system suited for producing and utilizing signals of the character exemplified by FIGS. 1A and 1B.

In the preferred system shown in FIG. 2, the analog keyer or modulator 10 includes a variable frequency oscillator whose output as applied to relay 11 effects vibration of the movable contact 12 for alternate engagement with fixed contact 12U, 12L at a corresponding frequency. The operating frequency of the keyer is dependent upon the analog signal received from the transducer 13 which is responsive to a variable being monitored. A suitable keyer is the Type 10754 telemetering oscillator made by the Leeds and Northrup Company. The transducer 13 may simply be a retransmitting slidewire positioned by a mechanical type of measuring instrument, a Lincoln thermal converter, or the like, depending upon the nature of the variable.

In the absence of keying modulation, the transmitter 14 produces carrier energy having the frequency F. Upon closure of the circuit from terminal 15U, which includes contacts 12, 12U of the keying relay, the output frequency of the transmitter 14 is $F+\Delta F$; and upon closure of the circuit from terminal 15L, which includes contacts 12, 12L of the keying relay, the output frequency of the transmitter 14 is $F-\Delta F$. Thus, assuming the keyer 16 does not inhibit closure of either of the keying circuits to terminals 15U, 15L, the output of the transmitter 14 is (as shown for intervals $I_1$, $I_4$ of FIG. 1A) a waveform frequency-modulated between the limits $F+\Delta F$, $F-\Delta F$ and having a repetition frequency corresponding with the analog value of the measured variable. A suitable transmitter 14 is the Type FS transmitter made by Radio Frequency Laboratories, Inc.

In the particular form shown in FIG. 2, the digital keyer 10 includes two switches 17U, 17L respectively included in the keying conductors 18U, 18L from the analog keyer 10 to the transmitter 14. When the cam 18 is in a neutral position, corresponding with its dwell portion 19, both switches 17U, 17L are closed. When the cam 18 is rotated in either direction from its neutral zone, one or the other of switches 17U, 17L is opened, effectively to suppress or inhibit the production of the positive or negative swings of the transmitter frequency with respect to frequency F. Thus, so long as both switches 17U, 17L of the digital keyer are closed, the analog keyer 10 is effective to vary the transmitter output frequency back and forth between $F+\Delta F$ and $F-\Delta F$ at a repetition frequency determined by the analog output of transducer 13 (see intervals $I_1$ and $I_4$ of FIG. 1A).

So long as the switch 17U of the digital keyer is open, the keying circuit, including contacts 12, 12U of the analog keyer 10, is disabled. Accordingly, the analog keyer is now effective to vary the transmitter output frequency back and forth between frequencies F and $F-\Delta F$ at the repetition frequency determined by the output of transducer 13 (see intervals $I_2$ and $I_5$ of FIG. 1A).

So long as switch 17L of the digital keyer 16 is open, the keying circuit, including contacts 12, 12L of the analog keyer 10, is disabled. Accordingly, the analog keyer is now effective to vary the transmitter output frequency back and forth between the frequencies F and $F+\Delta F$ at the repetition frequency determined by the output of transducer 13 (see intervals $I_3$ and $I_6$ of FIG. 1A).

The actuating shaft 20 of cam 19, or equivalent, may be coupled, for example, to a device measuring the output of an electrical generator so that the open position of switch 17U corresponds with a preset value of generation called the upper limit, and the open position of switch 17L corresponds with a preset value of generation called the lower limit, and the closed position of both switches 17U and 17L corresponds with the condition where neither preset limit is exceeded. These limits depend upon existing operating conditions at the generator and are frequently changed by the operating personnel at the generating station depending upon changes in conditions. Such changes are generally not known by personnel at the load dispatching office. The analog quantity to be telemetered could be the actual generation of the generating unit.

As an alternate example, the actuating shaft 20 of cam 19, or equivalent, may be coupled to a device generating control impulses so that the open position of switch 17U corresponds with a raise control command and the open position of switch 17L corresponds to a lower control command, and the closed position of both switches 17U, 17L corresponds with the condition where no control action is required. The analog quantity telemetered could, for example, be the area requirement for an electrical system.

The output of the transmitter 14 is applied to a communication link exemplified by line 25, for transmission of the analog and digital information to a remote receiver. The communication link, for example, may be a telephone line or a wideband microwave link capable of accommodating many narrow-band telemetering carriers similar to FIG. 1A and having suitably spaced average frequencies.

At a remote region, the telemetering signal is applied to a receiver 26 having in its input circuit a narrow bandpass filter suited to accept frequencies in the range of $F+\Delta F$ to $F-\Delta F$ and to reject other frequencies including those of adjacent channels concurrently conveying telemetering signals over the same wideband communication link.

The receiver 26 includes discriminator circuitry tuned to derive from the received telemetering signal C a demodulated signal D (FIG. 1B) whose waveform reproduces that of the signal C but with voltage deviations instead of frequency deviations. The fullwave A.C. voltage $E_R$ appearing across output terminals 27U, 27L of the receiver has a frequency which is the same as the repetition frequency of signal C; its positive halfwaves $E_R/2$ correspond with frequency deviations in one sense from the average carrier frequency F and the negative halfwaves $E_R/2$ correspond with the carrier frequency deviations of opposite sense. To insure the receiver output, despite variations in level of the carrier, is a faithful reproduction of the carrier modulation, the receiver also includes limiter and gain-controlled amplifier circuits.

The voltage $E_R/2$ appearing between terminals 27U, 27N of the receiver are D.C. pulses corresponding with the halfwaves of one polarity of the receiver output voltage $E_R$, and the voltage $E_R/2$ appearing between terminals 27L, 27N of the receiver are D.C. pulses corresponding with the halfwaves of opposite polarity. When the telemetering signal has no +ΔF modulation, the receiver output voltage between terminals 27U and 27N is zero, and when the telemetering signal has −ΔF component, the receiver output voltage between terminals 27L and 27N is zero. A suitable receiver is Type FS Receiver made by Radio Frequency Laboratories, Inc.

For operation of a D.C. meter or recorder 28 to indicate the analog information conveyed by the telemetering signal, the A.C. output of receiver 26 is applied to converter 29 whose output is a D.C. voltage or current of magnitude determined by the frequency of the receiver output. A suitable converter is Type 10799 converter made by Leeds and Northrup Company.

Figure 3:
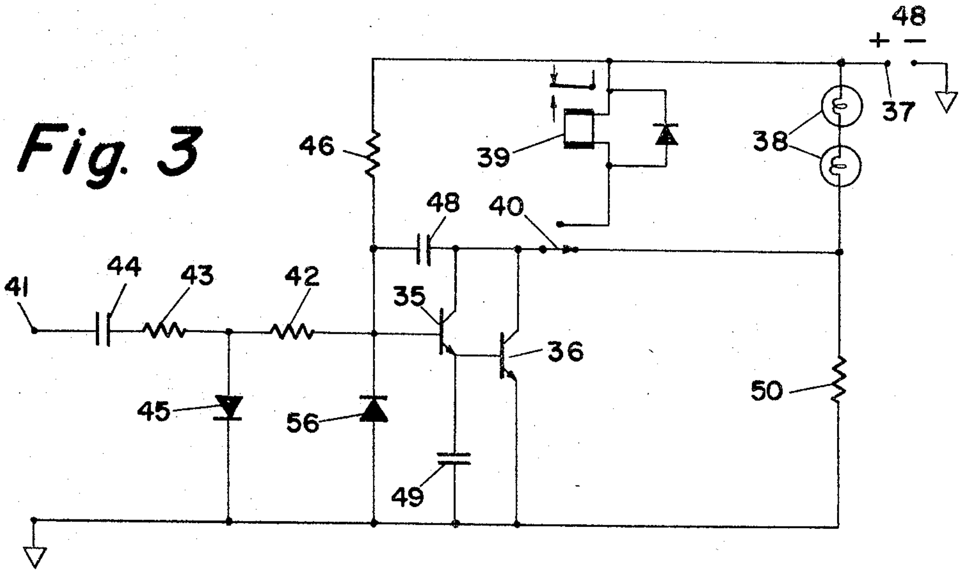
FIG. 3 is a circuit schematic of a decoder for abstracting digital information from the output of the telemetering receiver of FIG. 2.

For abstracting digital information contained in the demodulated signal D (FIG. 1B), the two halfwaves of the full receiver output voltage are, in the system of FIG. 2, respectively applied to the decoders 30U, 30L. A preferred circuit for each of the decoders is shown in FIG. 3. The collectors of transistors 35, 36 are connected to the positive terminal 37 of a suitable current supply source through either the lamp indicator 38 or the coil of relay 39 depending upon the position of the load selector switch 40. The emitter of transistor 36 is connected to the negative or grounded terminal of the supply source. The emitter of the transistor 35 is connected to the base of transistor 36, the two transistors so connected providing an amplifier stage having a very high current gain and high input impedance. The base of transistor 35 is connected to the input terminal 41 of the decoder through resistors 42, 43 and capacitor 44. The junction of resistors 42, 43 is connected to the ungrounded anode of diode 45 which together with resistors 42 and 46 provides a potential-divider circuit between the negative and positive terminals of the supply source.

In the absence of a periodic halfwave signal between the input terminals of the decoder, the transistors 35 and 36, because of the positive base bias derived from the potential-divider, are in saturated conductive state. Accordingly, the selected load device is energized by the collector-emitter current of the transistors, i.e., the indicator lamps 38 are bright or the contacts of relay 39 are in the pulled-in circuit relation. When the periodic halfwave signal is present, either alone or as a component of a fullwave signal, each positive-going rise is bypassed, so far as the transistors are concerned, through the current path afforded by capacitor 44, resistor 43 and diode 45, so to store a charge on the capacitor. For each subsequent negative-going fall of such halfwave signal, the capacitor 44 discharges through the path including the base emitter connections of transistors 35, 36 and the resistors 42, 43. In consequence, the transistors 35, 36 switch to the OFF state and the flow of their collector-emitter current through the associated load device ceases, i.e., the contacts of relay 39 go to the drop-out position or the lamps 38 go dark.

The diode 56 having its undergrounded cathode connected to the base of transistor 35 is provided to prevent driving the base circuit of the transistors negative enough to destroy either of them. The capacitor 48 connected between the base and collector of the transistor 35 serves as an integrator so to prevent chattering of the relay or blinking of the lights during application of the periodic signal. The smaller valued capacitor 49 between the base and emitter of transistor 36 is to suppress any high-frequency oscillations that might otherwise develop because of the high gain and common base current path of the transistors. The resistors 42, 43 are of sufficiently high resistance to minimize loading of the receiver by the decoder and the biasing resistor 46 is low enough to supply in absence of base current through resistors 42, 43, biasing current sufficient to keep both transistors saturated. The resistor 50 connected between the lamps 38 and the negative terminal of the current supply is provided to keep them burning dimly when the transistors are in the OFF state. Without the resistor 50, the in-rush current to the cold lamps when the transistors are turned ON exceeds the dissipation rating of the transistors; specifically it may be of the order of ten times the running current of the lamps. With the resistor 50 in circut, the in-rush current of the lamps is only of the order of twice their running current.

Suitable values for each of the decoders 30U and 30L are given in Table A below.

*Table A*

| | | |
|---|---|---|
| Transistors **35, 36** | | 2N2218 |
| Diode **45** | | UT112 |
| Diode **46** | | UT112 |
| Zener diodes **51** | | IN757 |
| Resistor **42** | kilohms | 47 |
| Resistor **43** | do | 22 |
| Resistor **46** | do | 680 |
| Resistor **50** | ohms | 2200 |
| Resistor **53** | kilohms | 10 |
| Capacitor **44** | mf | 0.5 |
| Capacitor **48** | mf | 0.5 |
| Capacitor **49** | mf | 0.005 |
| Capacitor **52** | mf | 1.0 |

Lamps 38, Type 327.
Relay 39, 2100 ohm coil: IBM 769489 Type.

From the foregoing description of the circuitry of each of the binary decoders 30U, 30L (FIG. 2), it will be understood:

(a) that when the frequency of the telemetering signal swings back and forth between limits $F+\Delta F$ and $F-\Delta F$, the alternate halfwaves of the resulting A.C. voltage as applied to the decoders maintains their associaed indicators 38U, 38L (or 39U, 39L) in the deenergized state.

(b) that when the frequency of the telemetering signal swings back and forth between the limits F and F+ΔF, the absence of a pulsating input to the decoder 30L causes the associated lamp 38L (or relay 39L) to be energized so to indicate a corresponding digital state of a condition at the transmitte.

(c) that when the frequency of the telemetering signal swings back and forth between F and F−ΔF, the absence of a pulsating input to decoder 30U causes the associated lamp 38U (or relay 39U) to be energized so to indicate a correspondingly different digital state of a condition at the transmitter.

With the receiver equipment as thus far described, when either of the switches 17U, 17L of the digital keyer is operated, the consequent abrupt change in input level to the converter 29 would produce a substantial spike in the trace of recorder 28. The two Zener diodes 51 connected back-to-back across the receiver output terminals 27U, 27L limit the peak-to-peak values of the A.C. voltage applied to converter 29. The RC network comprising capacitor 52 and resistor 53 serves to limit the current drawn from the receiver 26 and blocks the D.C. voltage of the receiver so that the Zener diodes 51 respond only to the A.C. voltage. With these added components, the spikes in the recorded converter output are negligible and do not cause any offset in the record.

What is claimed is:

1. In telemetry, a method of conveying both analog and digital information over a single channel from a first region to a second region which comprises performing at said first region the steps of (a) periodically shifting the frequency of carrier energy between two discrete values neither of which exceeds the frequency limits of said channel and at a repetition frequency corresponding with analog information concerning a single variable, (b) changing one of said discrete frequency values to a different value not exceeding either frequency limit of said channel in accordance with a change in the digital information, said first and second regions having between them a communication link providing said single channel for said carrier energy, and performing at said second region the steps of (c) deriving from the repetition frequency at which the carrier energy is periodically shifted an effect representative of said analog information, and (d) deriving from the discrete frequency values between which the carrier energy is periodically shifted an effect representative of said digital information.

2. In telemetry, a method of conveying both analog and digital information over a single channel from a first region to a second region which comprises performing at said first region the steps of (a) periodically shifting the frequency of carrier energy between two maximum deviation limits neither of which is beyond terminal frequencies of the channel and at a repetition frequency corresponding with the analog information concerning a single variable, (b) changing one or the other of said maximum deviation limits to the frequency midway of them in correspondence with a change in the digital information, said first and second regions having between them a communication link providing said single channel for said carrier energy, and performing at said second region the steps of (c) deriving from the frequency repetition at which the carrier energy is periodically shifted an effect representative of said analog information, (d) deriving from the carrier energy during periodic shifting of its frequency between one of said maximum deviation limits and said mid-frequency an effect representative of one value of said digital information, and (e) deriving from the carrier energy during periodic shifting of its frequency between the other of said maximum deviation limits and said mid-frequency an effect representative of another value of said digital information.

3. A method of conveying analog and digital information over a single telemetering channel characterized in that the frequency of carrier energy is periodically shifted between different pairs of discrete carrier frequencies all within said channel and at a repetition frequency representative of the analog information concerning a single variable, the frequency-shifting between one pair of discrete carrier frequencies additionally representing one value of the digital information, and the frequency-shifting between another pair of discrete carrier frequencies additionally representing another value of the digital information.

4. A method of conveying analog and digital information over a single telemetering channel characterized in that the frequency of carrier energy is periodically shifted at a repetition frequency representative of the analog information concerning a single variable and either within an upper band of said channel to represent one digital value, or within a lower band of said channel to represent another digital value.

5. In a telemetering system, the method of simultaneously transmitting analog and digital information comprising the steps of periodically shifting the frequency of a transmitted signal between two limits at a repetition frequency dependent upon the analog value of a single variable to be transmitted, and changing one of said limits upon change of digital information to be transmitted.

6. A telemetering system comprising means for producing at a first region a telemetering carrier whose frequency is periodically shifted between two discrete values at a repetition frequency corresponding with the analog information concerning a single variable, means at said first region for changing one or the other of said carrier frequency values in dependence upon digital information, means at a second region responsive to the repetition frequency of said carrier for reproducing said analog information, and means at said second region for decoding the digital information as represented by the frequency values between which the carrier frequency is shifted, said first and second regions having between them a communication link providing a single channel for said carrier.

7. A telemetering system comprising transmitter means suited selectively to produce at a first region an upper carrier frequency when keyed in a first circuit, a lower carrier frequency when keyed in a second circuit, and an intermediate carrier frequency when unkeyed, analog keyer means at said first region alternately keying said first and second circuits at a keying frequency representative of an analog value of a single variable, digital keyer means at said first region inhibiting one or the other of said keying circuits in correspondence with a digital value, means at a second region responsive to the keying frequency of said carrier for reproducing said analog information, and means at said second region decoding the digital information in the carrier as represented by the frequency swings between its intermediate frequency and its upper or lower frequency, said first and second regions having between them a communication link providing a single channel for said carrier.

8. A telemetering system as in claim 7 in which the decoding means comprises at least one electronic switching means which is biased to non-conductive state so long as the carrier swings between its said upper and lower frequencies and which is switched to conductive state when the carrier swings between its said intermediate frequency and one or the other of its said upper and lower frequencies.

9. A telemetering system as in claim 7 in which the decoding means comprises a pair of electronic switching means each biased to non-conductive state so long as the carrier swings between its said upper and lower frequencies, one of said electronic switching means switching to the conductive state when the carrier swings between its said intermediate frequency and its said upper frequency, and the other of said electronic switching means switching to the conductive state when the carrier swings between its said intermediate frequency and its said lower frequency.

10. A telemetering system comprising means for producing a telemetering signal whose carrier frequency is periodically shifted between two values at a repetition frequency corresponding with the analog value of a single condition, and means for changing one or the other of said carrier frequency values upon change in digital value of a condition.

11. A telemetering system comprising transmitter means suited selectively to produce any of three carrier frequencies, analog keyer means associated with said transmitter means for alternate production thereby of two of said carrier frequencies at a repetition frequency corresponding with the analog value of a single condition, and digital keyer means associated with said transmitter means for alternate production thereby at said repetition frequency of one of said two carrier frequencies and the third of said three carrier frequencies.

12. A telemetering system comprising
transmitter means suited selectively to produce an upper frequency when keyed in a first circuit, a lower frequency when keyed in a second circuit, and an intermediate frequency when unkeyed,
analog keyer means alternately keying said first and second circuits at a keying frequency representative of the analog value of a single condition, and
digital keyer means inhibiting one or the other of said keying circuits in correspondence with the digital value of a condition.

References Cited

UNITED STATES PATENTS

| | | | |
|---|---|---|---|
| 2,456,992 | 12/1948 | Pugsley. | |
| 3,007,042 | 10/1961 | Schweitzer | 340—208 X |

DAVID G. REDINBAUGH, *Primary Examiner.*

J. T. STRATMAN, *Assistant Examiner.*

UNITED STATES PATENT OFFICE
CERTIFICATE OF CORRECTION

Patent No. 3,323,061 May 30, 1967

Frederick B. Davis III

It is certified that error appears in the above identified patent and that said Letters Patent are hereby corrected as shown below:

Column 2, line 29, for "diviation" read -- deviation --; line 45, for "intterva's" read -- intervals --; column 5, line 4, for "$-\Delta F$" read -- no $-\Delta F$ --; column 6, line 5, for "circut" read -- circuit --; column 6, Table A, lines 5 and 9 thereof, for "kilohms", each occurrence, read -- kiloohms --.

Signed and sealed this 15th day of July 1969.

(SEAL)
Attest:

Edward M. Fletcher, Jr.
Attesting Officer

WILLIAM E. SCHUYLER, JR.
Commissioner of Patents